(12) United States Patent
Bidichandani et al.

(10) Patent No.: US 8,484,178 B1
(45) Date of Patent: Jul. 9, 2013

(54) FILE SHARING

(75) Inventors: Sameer Bidichandani, Los Gatos, CA (US); Todd Tokubo, Newark, CA (US); Aswath Mohan, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1540 days.

(21) Appl. No.: 11/364,539

(22) Filed: Feb. 27, 2006

(51) Int. Cl.
*G06F 17/30* (2006.01)

(52) U.S. Cl.
USPC .......................................... 707/706; 707/770

(58) Field of Classification Search
USPC ................ 707/102, 104.1, 706, 999.107, 770
See application file for complete search history.

(56) References Cited

U.S. PATENT DOCUMENTS

| | | | |
|---|---|---|---|
| 6,397,061 B1 * | 5/2002 | Jordan et al. | 455/421 |
| 7,590,659 B2 * | 9/2009 | Mercer et al. | 1/1 |
| 7,685,204 B2 * | 3/2010 | Rogers | 707/770 |
| 8,346,798 B2 * | 1/2013 | Spiegelman et al. | 707/770 |
| 2004/0064476 A1 * | 4/2004 | Rounds | 707/104.1 |
| 2005/0172786 A1 * | 8/2005 | Plastina et al. | 84/600 |
| 2006/0123058 A1 * | 6/2006 | Mercer et al. | 707/104.1 |
| 2006/0258289 A1 * | 11/2006 | Dua | 455/41.3 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

(Continued)

*Primary Examiner* — Robert Beausoliel, Jr.
*Assistant Examiner* — Noosha Arjomandi (57) ABSTRACT

A first device having a corresponding method and computer program comprises a storage device to store a first media file of data; a memory to store a playlist comprising a first pointer to the first media file of the first data, and at least one second pointer to at least one second media file of second data stored on one or more second devices; and an output circuit to transmit the playlist and portions of the first media file of the first data.

15 Claims, 9 Drawing Sheets

OTHER PUBLICATIONS

IEEE Std 802.11g/D2.8, May 2002 (Supplement to ANSI/IEEE Std 802.11, 1999 Edition) DRAFT Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

802.11n; IEEE P802.11-04/0889r6; Wireless LANs, TGn Sync Proposal Technical Specification; 131 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

\* cited by examiner

FILE SHARING

BACKGROUND

The present invention relates generally to data communications. More particularly, the present invention relates to file sharing.

SUMMARY

In general, in one aspect, the invention features an apparatus comprising a storage device to store a media file of data; a memory; a first control circuit to transfer portions of the media file of the data from the storage device to the memory; and a wireless output circuit to wirelessly transmit each one of the portions of the media file of the data over a wireless network to all of a plurality of network devices before transmitting a subsequent portion of the media file of the data; and a second control circuit to limit a number of the network devices according to a bandwidth of the wireless network.

In some embodiments, the second control circuit authenticates each of the network devices before wirelessly transmitting the portions of the media file of the data to the respective network device. In some embodiments, to wirelessly transmit the portions of the media file of the data, the wireless output circuit wirelessly transmits unicast packets of the data. Some embodiments comprise a media player comprising the apparatus. In some embodiments, the media player is compliant with at least one standard selected from the group consisting of IEEE standards 802.11, 802.11a, 802.11b, 802.11g, 802.11n, 802.16, and 802.20.

In general, in one aspect, the invention features a method comprising storing a media file of data in a storage device; transferring portions of the media file of the data from the storage device to a memory; wirelessly transmitting each one of the portions of the media file of the data over a wireless network to all of a plurality of network devices before transmitting a subsequent portion of the media file of the data; and limiting a number of the network devices according to a bandwidth of the wireless network.

Some embodiments comprise authenticating each of the network devices before wirelessly transmitting the portions of the media file of the data to the respective network device. In some embodiments, wirelessly transmitting the portions of the media file of the data comprises wirelessly transmitting unicast packets of the data. In some embodiments, the method is compliant with at least one standard selected from the group consisting of IEEE standards 802.11, 802.11a, 802.11b, 802.11g, 802.11n, 802.16, and 802.20.

In general, in one aspect, the invention features an apparatus comprising a storage device to store a media file of data; a memory; a first control circuit to transfer portions of the media file of the data from the storage device to the memory; a wireless output circuit to wirelessly transmit each one of the portions of the media file of the data over a wireless network a consecutive plurality of times N before transmitting a subsequent portion of the media file of the data; and a second control circuit to determine a value of N in accordance with a bandwidth of the wireless network.

In some embodiments, to wirelessly transmit the portions of the media file of the data, the wireless output circuit wirelessly transmits multicast packets of the data. Some embodiments comprise a media player comprising the apparatus. In some embodiments, the media player is compliant with at least one standard selected from the group consisting of IEEE standards 802.11, 802.11a, 802.11b, 802.11g, 802.11n, 802.16, and 802.20.

In general, in one aspect, the invention features a method comprising storing a media file of data on a storage device; transferring portions of the media file of the data from the storage device to a memory; and wirelessly transmitting each one of the portions of the media file of the data over a wireless network a consecutive plurality of times N before transmitting a subsequent portion of the media file of the data; and determining a value of N in accordance with a bandwidth of the wireless network.

In some embodiments, wirelessly transmitting the portions of the media file of the data comprises wirelessly transmitting multicast packets of the data. In some embodiments, the method is compliant with at least one standard selected from the group consisting of IEEE standards 802.11, 802.11a, 802.11b, 802.11g, 802.11n, 802.16, and 802.20.

In general, in one aspect, the invention features a first device comprising a storage device to store a first media file of data; a memory to store a playlist comprising a first pointer to the first media file of the first data, and at least one second pointer to at least one second media file of second data stored on one or more second devices; and an output circuit to transmit the playlist and portions of the first media file of the first data.

Some embodiments comprise an input circuit to receive a third pointer to a third media file of third data stored on one of the second devices; and a control circuit to add the third pointer to the playlist. Some embodiments comprise a control circuit to control the playlist; wherein, when a connection to one of the second devices is lost, the control circuit removes, from the playlist, the second pointers to the second media files of the second data stored on the one of the second devices. Some embodiments comprise an input circuit to receive a plurality of votes from the second devices; and a control circuit to modify an order of play of the pointers in the playlist according to the votes. In some embodiments, the first device acts as the master of an ad-hoc network comprising the first and second devices. In some embodiments, when one of the second media files of the second data is to be played, the output circuit transmits a token to the second device storing the one of the second media files of the second data; and wherein the second device storing the one of the second media files of the second data becomes the master of the ad-hoc network in response to the token. Some embodiments comprise an authentication circuit to authenticate each of the second devices before transmitting the portions of the first media file of the first data to the respective second device. In some embodiments, the authentication circuit limits a number of the second devices according to a throughput of a network connecting the first device and the second devices. Some embodiments comprise a media player comprising the first device. In some embodiments, the media player is compliant with at least one standard selected from the group consisting of IEEE standards 802.11, 802.11a, 802.11b, 802.11g, 802.11n, 802.16, and 802.20.

In general, in one aspect, the invention features a method for a first device, the method comprising storing a first media file of data on the device; storing a playlist on the device, the playlist comprising a first pointer to the first media file of the first data, and at least one second pointer to at least one second media file of second data stored on one or more second devices; and transmitting the playlist and portions of the first media file of the first data.

Some embodiments comprise receiving a third pointer to a third media file of third data stored on one of the second devices; and adding the third pointer to the playlist. Some embodiments comprise removing, from the playlist, the second pointers to the second media files of the second data stored on one of the second devices when a connection to the one of the second devices is lost. Some embodiments comprise receiving a plurality of votes from the second devices; and modifying an order of play of the pointers in the playlist according to the votes. Some embodiments comprise acting as the master of an ad-hoc network comprising the first and second devices. Some embodiments comprise transmitting a token to the second device storing one of the second media files of the second data when the one of the second media files of the second data is to be played; wherein the second device storing the one of the second media files of the second data becomes the master of the ad-hoc network in response to the token. Some embodiments comprise authenticating each of the second devices before transmitting the portions of the first media file of the first data to the respective second device. Some embodiments comprise limiting a number of the second devices according to a throughput of a network connecting the first device and the second devices. In some embodiments, the first device is compliant with at least one standard selected from the group consisting of IEEE standards 802.11, 802.11a, 802.11b, 802.11g, 802.11n, 802.16, and 802.20.

In general, in one aspect, the invention features a first device comprising a storage device to store a first media file of first data; an output circuit to transmit, to a second device, a first pointer to the first media file of the first data; an input circuit to receive a playlist and portions of a second media file of second data from the second device, the playlist comprising the first pointer and a second pointer to the second media file of the second data; and a memory to store the playlist.

In some embodiments, the input circuit receives a token when the first media file of the first data is to be played; and wherein the output circuit transmits portions of the first media file of the first data in response to the token. In some embodiments, the second device acts as the master of an ad-hoc network comprising the first and second devices while transmitting the portions of the second media file of the second data; and wherein the first device becomes the master of the ad-hoc network in response to the token. Some embodiments comprise an authentication circuit to authenticate the first device to the second device. Some embodiments comprise a media player comprising the first device. In some embodiments, the media player is compliant with at least one standard selected from the group consisting of IEEE standards 802.11, 802.11a, 802.11b, 802.11g, 802.11n, 802.16, and 802.20. Some embodiments comprise a control circuit to store the portions of the second media file of the second data in the memory; and a digital rights management circuit to remove some of the portions of the second media file of the second data from the memory before the control circuit stores others of the portions of the second media file of the second data in the memory.

In general, in one aspect, the invention features a method for a first device, the method comprising storing a first media file of first data; transmitting, to a second device, a first pointer to the first media file of the first data; receiving a playlist and portions of a second media file of second data from the second device, the playlist comprising the first pointer and a second pointer to the second media file of the second data; and storing the playlist.

Some embodiments comprise receiving a token when the first media file of the first data is to be played; and transmitting portions of the first media file of the first data in response to the token. In some embodiments, the second device acts as the master of an ad-hoc network comprising the first and second devices while transmitting the portions of the second media file of the second data, further comprising acting as the master of the ad-hoc network in response to the token. Some embodiments comprise authenticating the first device to the second device. In some embodiments, the first device is compliant with at least one standard selected from the group consisting of IEEE standards 802.11, 802.11a, 802.11b, 802.11g, 802.11n, 802.16, and 802.20. Some embodiments comprise storing the portions of the second media file of the second data in the first device; and removing some of the portions of the second media file of the second data from the first device before storing others of the portions of the second media file of the second data in the first device.

In general, in one aspect, the invention features an apparatus comprising storage device means for storing a media file of data; memory means for storing the data; first control means for transferring portions of the media file of the data from the storage device means to the memory means; and wireless output means for wirelessly transmit each one of the portions of the media file of the data over a wireless network to all of a plurality of network devices before transmitting a subsequent portion of the media file of the data; and second control means for limiting a number of the network devices according to a bandwidth of the wireless network.

In some embodiments, the second control means authenticates each of the network devices before wirelessly transmitting the portions of the media file of the data to the respective network device. In some embodiments, for wirelessly transmitting the portions of the media file of the data, the wireless output means wirelessly transmits unicast packets of the data. Some embodiments comprise a media player comprising the apparatus. In some embodiments, the media player is compliant with at least one standard selected from the group consisting of IEEE standards 802.11, 802.11a, 802.11b, 802.11g, 802.11n, 802.16, and 802.20.

In general, in one aspect, the invention features a computer program comprising causing transfer of portions of a media file of data from a storage device to a memory; causing wireless transmission of each one of the portions of the media file of the data over a wireless network to all of a plurality of network devices before transmission of a subsequent portion of the media file of the data; and limiting a number of the network devices according to a bandwidth of the wireless network.

Some embodiments comprise authenticating each of the network devices before wirelessly transmitting the portions of the media file of the data to the respective network device. In some embodiments, causing wireless transmission of the portions of the media file of the data comprises causing wireless transmission of unicast packets of the data. In some embodiments, the wireless transmission is compliant with at least one standard selected from the group consisting of IEEE standards 802.11, 802.11a, 802.11b, 802.11g, 802.11n, 802.16, and 802.20.

In general, in one aspect, the invention features an apparatus comprising storage device means for storing a media file of data; memory means for storing the data; first control means for transferring portions of the media file of the data from the storage device means to the memory means; wireless output means for wirelessly transmitting each one of the portions of the media file of the data over a wireless network a consecutive plurality of times N before transmitting a subsequent portion of the media file of the data; and second control means for determining a value of N in accordance with a bandwidth of the wireless network.

In some embodiments, for wirelessly transmitting the portions of the media file of the data, the wireless output means wirelessly transmits multicast packets of the data. Some embodiments comprise a media player comprising the apparatus. In some embodiments, the media player is compliant with at least one standard selected from the group consisting of IEEE standards 802.11, 802.11a, 802.11b, 802.11g, 802.11n, 802.16, and 802.20.

In general, in one aspect, the invention features a computer program comprising causing transfer of portions of a media file of data from a storage device to a memory; causing wireless transmission of each one of the portions of the media file of the data over a wireless network a consecutive plurality of times N before transmission of a subsequent portion of the media file of the data; and determining a value of N in accordance with a bandwidth of the wireless network.

In some embodiments, causing wireless transmission of the portions of the media file of the data comprises causing wireless transmission of multicast packets of the data. In some embodiments, the wireless transmission of is compliant with at least one standard selected from the group consisting of IEEE standards 802.11, 802.11a, 802.11b, 802.11g, 802.11n, 802.16, and 802.20.

In general, in one aspect, the invention features a first device comprising storage means for storing a first media file of data; memory means for storing a playlist comprising a first pointer to the first media file of the first data, and at least one second pointer to at least one second media file of second data stored on one or more second devices; and output means for transmitting the playlist and portions of the first media file of the first data.

Some embodiments comprise input means for receiving a third pointer to a third media file of third data stored on one of the second devices; and control means for adding the third pointer to the playlist. Some embodiments comprise control means for controlling the playlist; wherein, when a connection to one of the second devices is lost, the control means removes, from the playlist, the second pointers to the second media files of the second data stored on the one of the second devices. Some embodiments comprise input means for receiving a plurality of votes from the second devices; and control means for modifying an order of play of the pointers in the playlist according to the votes. In some embodiments, the first device acts as the master of an ad-hoc network comprising the first and second devices. In some embodiments, when one of the second media files of the second data is to be played, the output means transmits a token to the second device storing the one of the second media files of the second data; and wherein the second device storing the one of the second media files of the second data becomes the master of the ad-hoc network in response to the token. Some embodiments comprise means for authenticating each of the second devices before transmitting the portions of the first media file of the first data to the respective second device. In some embodiments, the means for authenticating limits a number of the second devices according to a throughput of a network connecting the first device and the second devices. Some embodiments comprise a media player comprising the first device. In some embodiments, the media player is compliant with at least one standard selected from the group consisting of IEEE standards 802.11, 802.11a, 802.11b, 802.11g, 802.11n, 802.16, and 802.20.

In general, in one aspect, the invention features a computer program for a first device, the computer program comprising storing a first media file of data on the first device; storing a playlist on the first device, the playlist comprising a first pointer to the first media file of the first data, and at least one second pointer to at least one second media file of second data stored on one or more second devices; and causing transmission of the playlist and portions of the first media file of the first data.

Some embodiments comprise receiving a third pointer to a third media file of third data stored on one of the second devices; and adding the third pointer to the playlist. Some embodiments comprise removing, from the playlist, the second pointers to the second media files of the second data stored on one of the second devices when a connection to the one of the second devices is lost. Some embodiments comprise receiving a plurality of votes from the second devices; and modifying an order of play of the pointers in the playlist according to the votes. Some embodiments comprise causing the first device to act as the master of an ad-hoc network comprising the first and second devices. Some embodiments comprise causing transmission of a token to the second device storing one of the second media files of the second data when the one of the second media files of the second data is to be played; wherein the second device storing the one of the second media files of the second data becomes the master of the ad-hoc network in response to the token. Some embodiments comprise authenticating each of the second devices before transmitting the portions of the first media file of the first data to the respective second device. Some embodiments comprise limiting a number of the second devices according to a throughput of a network connecting the first device and the second devices. In some embodiments, the first device is compliant with at least one standard selected from the group consisting of IEEE standards 802.11, 802.11a, 802.11b, 802.11g, 802.11n, 802.16, and 802.20.

In general, in one aspect, the invention features a first device comprising storage means for storing a first media file of first data; output means for transmitting, to a second device, a first pointer to the first media file of the first data; input means for receiving a playlist and portions of a second media file of second data from the second device, the playlist comprising the first pointer and a second pointer to the second media file of the second data; and memory means for storing the playlist.

In some embodiments, the input means receives a token when the first media file of the first data is to be played; and wherein the output means transmits portions of the first media file of the first data in response to the token. In some embodiments, the second device acts as the master of an ad-hoc network comprising the first and second devices while transmitting the portions of the second media file of the second data; and wherein the first device becomes the master of the ad-hoc network in response to the token. Some embodiments comprise authentication means for authenticating the first device to the second device. Some embodiments comprise a media player comprising the first device. In some embodiments, the media player is compliant with at least one standard selected from the group consisting of IEEE standards 802.11, 802.11a, 802.11b, 802.11g, 802.11n, 802.16, and 802.20. Some embodiments comprise control means for storing the portions of the second media file of the second data in the memory means; and digital rights management means for removing some of the portions of the second media file of the second data from the memory before the control means stores others of the portions of the second media file of the second data in the memory means.

In general, in one aspect, the invention features a computer program for a first device, the computer program comprising storing a first media file of first data; causing transmission, to a second device, of a first pointer to the first media file of the first data; receiving a playlist and portions of a second media file of second data from the second device, the playlist comprising the first pointer and a second pointer to the second media file of the second data; and storing the playlist.

Some embodiments comprise receiving a token when the first media file of the first data is to be played; and causing transmission of portions of the first media file of the first data in response to the token. In some embodiments, the second device acts as the master of an ad-hoc network comprising the first and second devices while transmitting the portions of the second media file of the second data, further comprising causing the first device to act as the master of the ad-hoc network in response to the token. Some embodiments comprise authenticating the first device to the second device. In some embodiments, the first device is compliant with at least one standard selected from the group consisting of IEEE standards 802.11, 802.11a, 802.11b, 802.11g, 802.11n, 802.16, and 802.20. Some embodiments comprise storing the portions of the second media file of the second data in the first device; and removing some of the portions of the second media file of the second data from the first device before storing others of the portions of the second media file of the second data in the first device.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present invention provide apparatus, methods, and computer programs for wireless file sharing.

Figure 1:
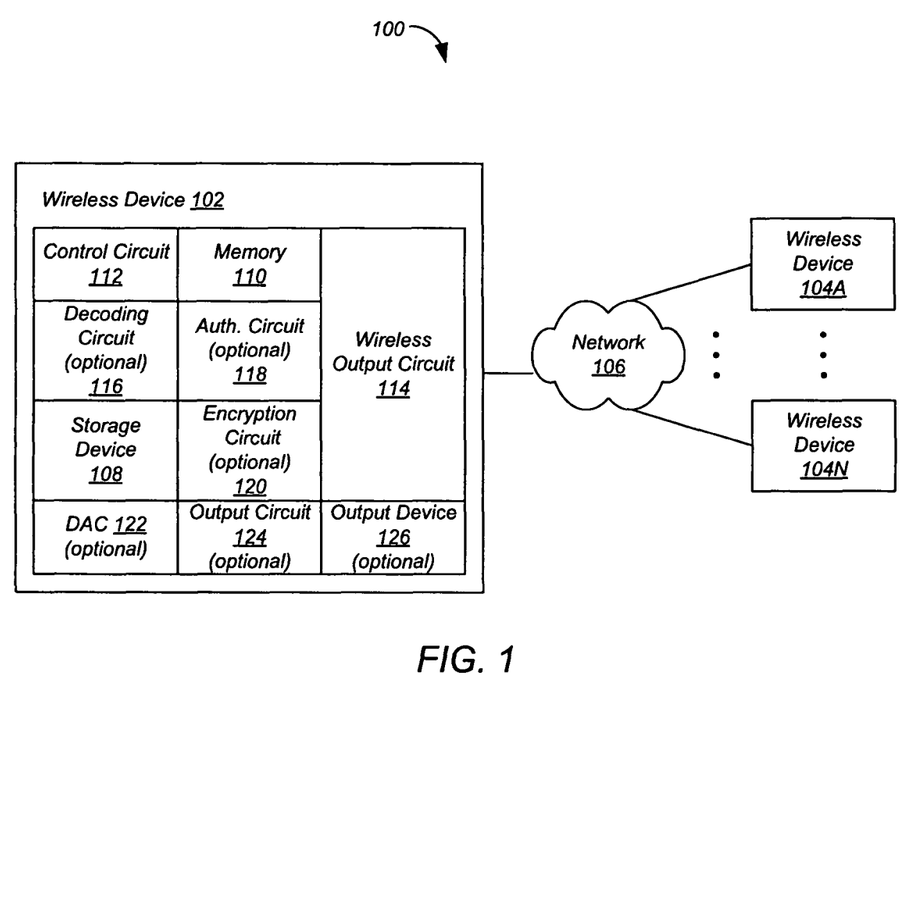
FIG. 1 shows a multimedia radio system according to a preferred embodiment of the present invention.

FIG. 1 shows a multimedia radio system 100 according to a preferred embodiment of the present invention. While in the following description, multimedia radio system 100 is described as a wireless system, in other embodiments multimedia radio system 100 is a wired system, System 100 comprises a wireless device 102 that acts as a multimedia radio transmitter and one or more wireless devices 104A-N that act as multimedia radio receivers. Preferably wireless devices 102 and 104 connect over a network 106, although this is not required. Network 106 is preferably a Wireless Local Area Network (WLAN), and wireless devices 102 and 104 are preferably compliant with one or more of IEEE standards 802.11, 802.11a, 802.11b, 802.11g, 802.11n, 802.16, and 802.20.

Wireless device 102 preferably comprises a storage device 108 to store at least one media file of data, a memory 110, a control circuit 112 to transfer the media files from storage device 108 to memory 110, and a wireless output circuit 114 to wirelessly transmit the media files, preferably to network 106. Wireless device 102 optionally comprises a decoding circuit 116, an authentication circuit 118, and an encryption circuit 120. Wireless devices 104 preferably include similar elements.

Wireless devices 102 and 104 can be implemented as media players. In such embodiments wireless device 102 comprises a digital-to-analog converter (DAC) 122, an output circuit 124, and an optional output device 126. Wireless devices 104 preferably include similar elements.

The data in the media files can represent images, text, video, audio, and the like, for transfer as files or by streaming. Storage device 108 can be implemented as a hard disk drive or the like. Memory 110 can be implemented as random access memory (RAM) or the like. Output circuit 124 can be implemented as a headset interface, a display interface, and the like. Output device 126 can be implemented as a headset, a display, and the like.

Figure 2:
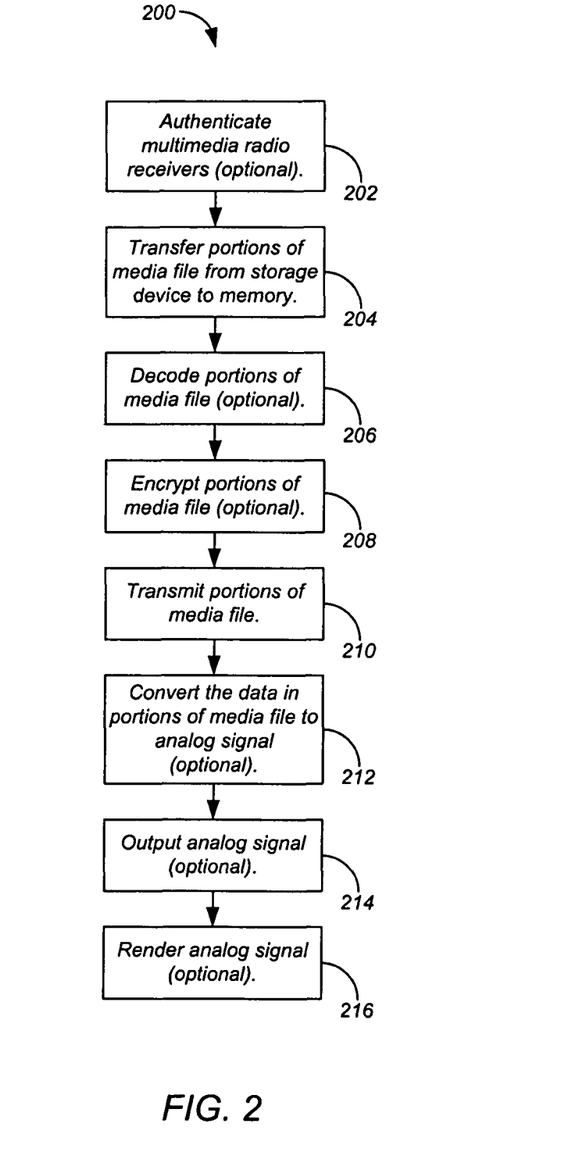
FIG. 2 shows a process for the multimedia radio system of FIG. 1 according to a preferred embodiment of the present invention.

FIG. 2 shows a process 200 for multimedia radio system 100 of FIG. 1 according to a preferred embodiment of the present invention. In some embodiments, multimedia radio system 100 is organized as an exclusive club. In such embodiments, a multimedia radio receiver 104 must authenticate itself to multimedia radio transmitter 102 before receiving transmissions of the media files stored on storage device 108 of multimedia radio transmitter 102. In such embodiments, authentication circuit 118 of multimedia radio transmitter 102 authenticates each multimedia radio receiver 104 (step 202) before transmitting the portions of the media files of the data to that multimedia radio receiver 104.

In some embodiments the number of multimedia radio receivers 104 is limited to a maximum number. In such embodiments, authentication circuit 118 of multimedia radio transmitter 102 limits the number of multimedia radio receivers 104 in the club, for example by refusing to authenticate a multimedia radio receiver 104 when the number of multimedia radio receivers 104 in the club has reached the maximum number. The maximum number can be predetermined or dynamically calculated, for example based on a throughput of wireless network 106, a transmit data rate of wireless output circuit 114, and the like.

Control circuit 112 transfers portions of one of the media files from storage device 108 to memory 110 (step 204). Each portion is preferably a small part of the media file so that many portions must be transferred to transfer the entire media file from storage device 108 to memory 110. For streaming media, the portions are transferred sequentially.

In some embodiments, the data in the media file is encoded, for example for compression purposes. For example, media files of audio data may be encoded according to MP3 formats and the like, media files of video data may be encoded according to MPEG standards and the like, and so on. In these embodiments, decoding circuit 116 decodes each portion of the media files (step 206), either before or after transfer to memory 110.

In some embodiments, the transmissions of wireless output circuit 114 are encrypted, for example according to Wired Equivalent Privacy (WEP), Wi-Fi Protected Access (WPA and WPA2), and the like. In such embodiments, encryption circuit 120 encrypts each portion of the media file before transmission (step 208).

Wireless output circuit 114 transmits the portions of the media file (step 210), for example as described in detail below. In embodiments where wireless device 102 is implemented as a media player, optional digital-to-analog converter 122 converts the data in the portions of the media file to an analog signal (step 212), and optional output circuit 124 outputs the analog signal (step 214). In some embodiments, an optional output device 126 renders the analog signal (step 216), for example by producing sounds, images, video, and the like based on the analog signal.

Figure 3:
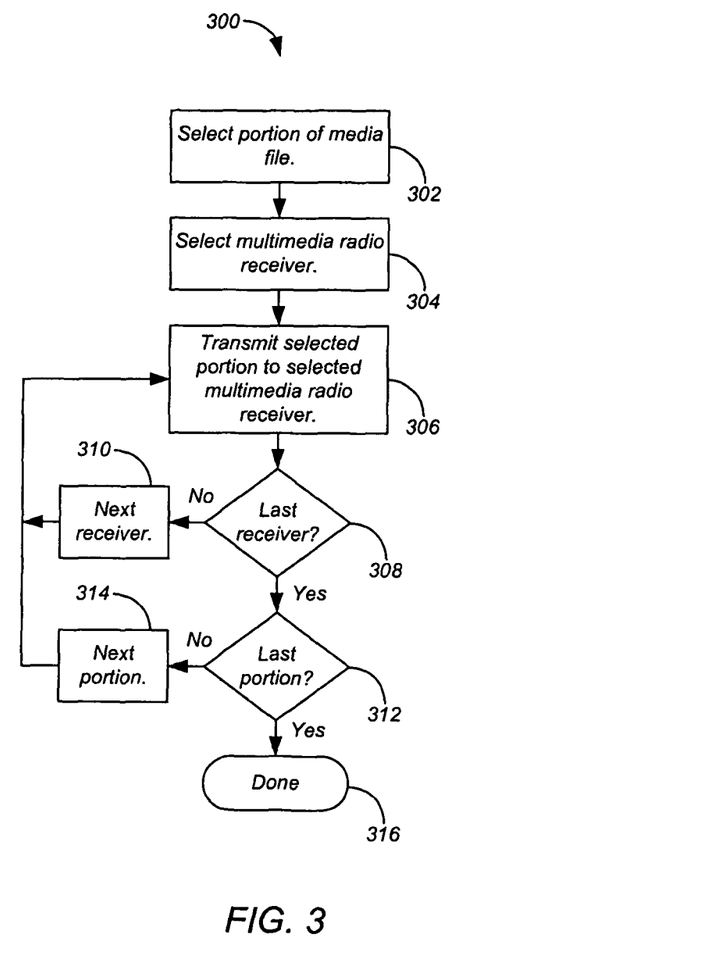
FIG. 3 shows a process for transmitting the portions of the media file of the process of FIG. 2 according to one embodiment.

FIG. 3 shows a process 300 for transmitting the portions of the media file of process 200 of FIG. 2 according to one embodiment. Referring to FIG. 3, process 300 selects a portion of the media file for transmission (step 302), and selects one of the multimedia radio receivers 104 to receive the selected portion (step 304). Process 300 then transmits the selected portion over wireless network 106 to the selected multimedia radio receiver 104 (step 306), preferably as one or more unicast packets. Then if any of the multimedia radio receivers 104 have not received the selected portion (step 308), process 300 selects one of those multimedia radio receivers 104 (step 310) and then transmits the selected portion to the selected multimedia radio receiver 104 (resuming at step 306). Preferably optional authentication circuit 118 of multimedia radio transmitter 102 limits the number of multimedia radio receivers 104 that receive the portions of the media file, for example according to a bandwidth of wireless network 106, a transmit data rate of wireless output circuit 114, and the like.

When the selected portion of the media file has been successfully transmitted to all of the multimedia radio receivers 104 (step 308), and if portions of the media file remain to be transmitted (step 312), process 300 selects one of those portions of the media file for transmission (step 316) and then transmits the selected portion to the selected multimedia radio receiver 104 (resuming at step 306). When all of the portions of the media file have been transmitted (step 314), process 300 is done (step 318).

Figure 4:
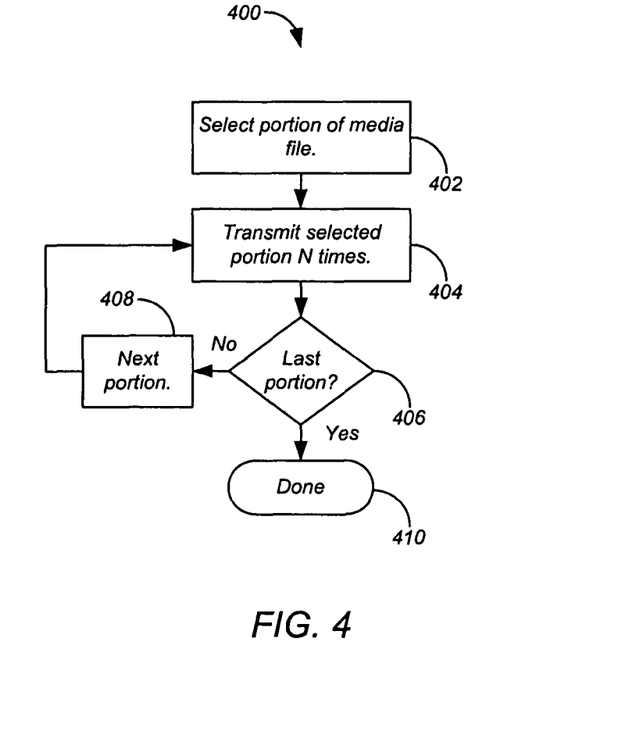
FIG. 4 shows a process for transmitting the portions of the media file of the process of FIG. 2 according to another embodiment.

FIG. 4 shows a process 400 for transmitting the portions of the media file of process 200 of FIG. 2 according to another embodiment. Referring to FIG. 4, process 400 selects a portion of the media file for transmission (step 402). Process 400 then transmits the selected portion over wireless network 106 a consecutive plurality of times N (step 404), preferably as one or more multicast packets. Preferably optional authentication circuit 118 determines the value of N in accordance with the bandwidth of wireless network 106.

If portions of the media file remain to be transmitted (step 406), process 400 selects one of those portions of the media file for transmission (step 408) and transmits the selected portion a predetermined consecutive plurality of times N (resuming at step 404). When all of the portions of the media file have been transmitted (step 406), process 400 is done (step 410).

Figure 5:
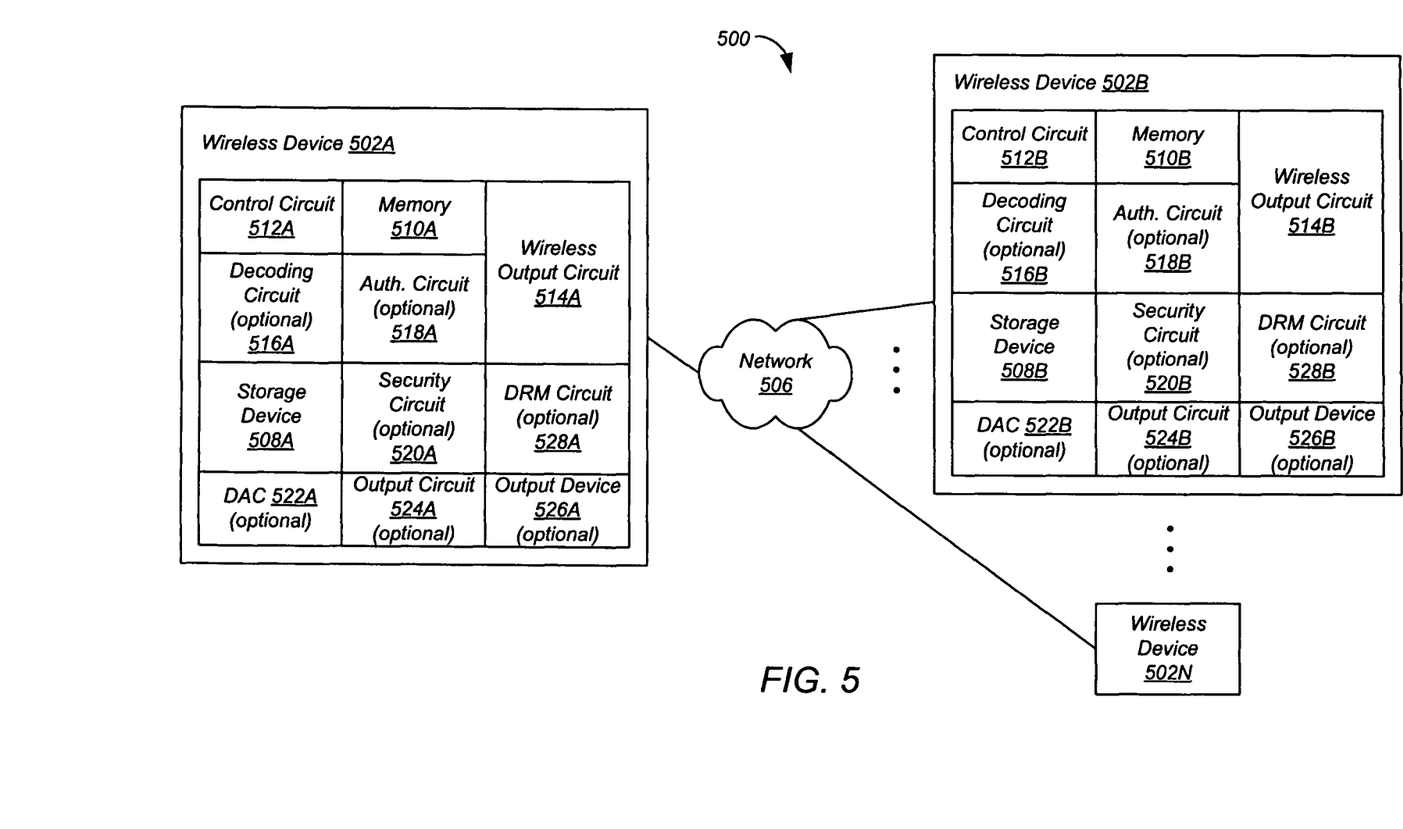
FIG. 5 shows a wireless multimedia jukebox system according to a preferred embodiment of the present invention.

FIG. 5 shows a wireless multimedia jukebox system 500 according to a preferred embodiment of the present invention. System 500 comprises a plurality of wireless devices 502A-N that take turns acting as a media transmitter, while the other wireless devices 502 act as media receivers, in order to share media files stored on the wireless devices 502.

Preferably wireless devices 502 connect over a network 506, although this is not required. Network 506 is preferably a Wireless Local Area Network (WLAN), and wireless devices 502 are preferably compliant with one or more of IEEE standards 802.11, 802.11a, 802.11b, 802.11g, 802.11n, 802.16, and 802.20.

For clarity of explanation, FIG. 5 shows details of only wireless devices 502A and 502B. Each wireless device 502A,B preferably comprises a storage device 508A,B to store media files of data, a memory 510A,B to store a playlist, a control circuit 512A,B, and a wireless output circuit 514A,B to wirelessly transmit the media files, preferably to network 506. Each wireless media player 502 optionally comprises a decoding circuit 516A,B and an authentication circuit 518A,B, which function for example as described above. Each wireless media player 502 optionally comprises a security circuit 520A,B to encrypt transmitted data and decrypt received data.

Wireless devices 502 can be implemented as media players, and are referred to as such in the following discussion. In such embodiments each wireless media player 502A,B comprises a digital-to-analog converter 522A,B, an output circuit 524A,B, and an optional output device 526A,B, which function, for example, as described above. Each wireless devices 502 also preferably comprises an optional digital rights management (DRM) circuit 528A,B to implement one or more DRM techniques.

The data in the media files can represent images, text, video, audio, and the like, for transfer as files or by streaming. Storage devices 508 can be implemented as hard disk drives or the like. Memories 510 can be implemented as random access memories (RAM) or the like. Output circuits 524 can be implemented as headset interfaces, display interfaces, and the like. Output devices 526 can be implemented as headsets, displays, and the like.

Figure 6:
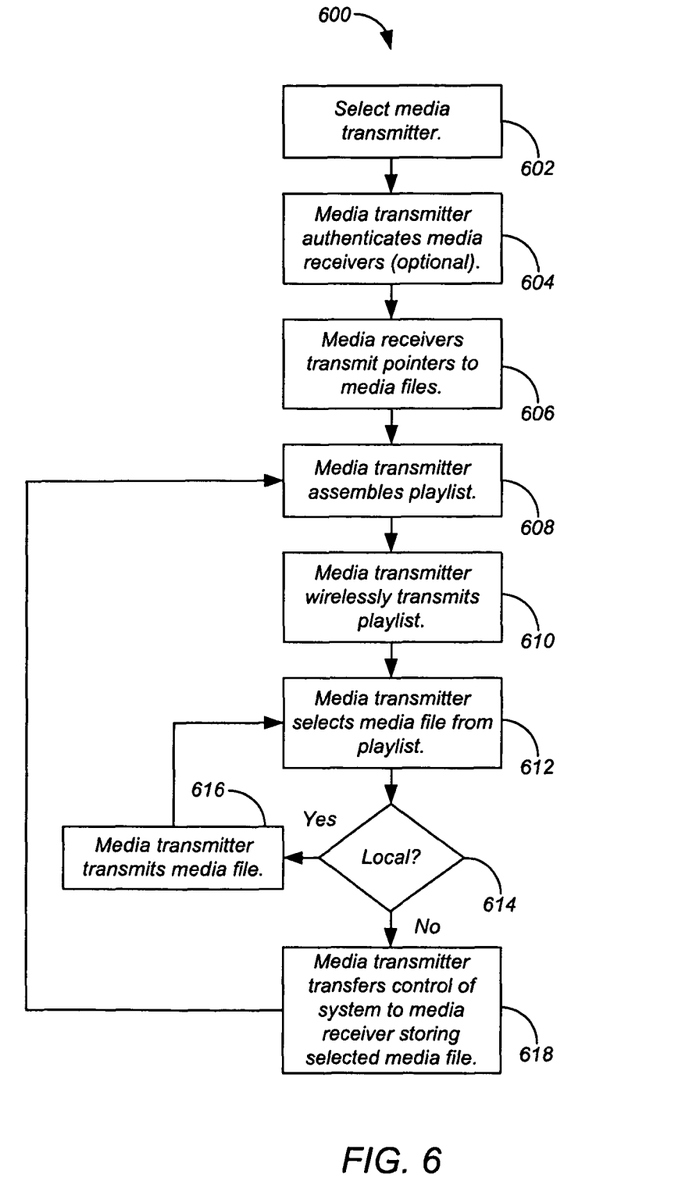
FIG. 6 shows a process for the multimedia jukebox system of FIG. 5 according to a preferred embodiment of the present invention.

FIG. 6 shows a process 600 for multimedia jukebox system 500 of FIG. 5 according to a preferred embodiment of the present invention. Process 600 selects one of wireless media players 502 to act initially as the media transmitter (step 602). Preferably wireless media players 502 form an ad-hoc network 506, and the wireless media player 502 that is selected as the master of the ad-hoc network 506 is also selected to act as the media transmitter. However, the selection process can take any form. For clarity of explanation, assume that wireless media player 502A is initially selected as the media transmitter.

In some embodiments, multimedia jukebox system 500 is organized as an exclusive club. In such embodiments, each media receiver 502B-N must authenticate itself to media transmitter 502A before receiving transmissions of media files from the media transmitter 502A. In such embodiments, authentication circuit 518A of wireless media player 502A authenticates each media receiver 502B-N before transmitting portions of the media files to wireless media player 502A (step 604).

In some embodiments the number of wireless media players 502 in multimedia jukebox system 500 is limited to a maximum number. In such embodiments, authentication circuit 518A of media transmitter 502A limits the number of wireless media players 502 in the club, for example by refusing to authenticate a wireless media player 502 when the number of wireless media players 502 in the club has reached the maximum number. The maximum number can be predetermined or dynamically calculated, for example based on a throughput of wireless network 506, a transmit data rate of wireless output circuit 514A, and the like.

Storage devices 508 store media files. Media receivers 502B-N inform media transmitter 502A of the media files stored on their storage devices 508B-N that are available for sharing, for example by transmitting pointers to the media files to media transmitter 502A (step 606).

Media transmitter 502A assembles the playlist in memory 510A of the media files that are available for sharing by wireless media players 502 (step 608). The playlist comprises pointers to the media files stored on media transmitter 502A, and stored on media receivers 502B-N, that are available for sharing. The playlist also preferably comprises metadata for each media file such as media type, format, title, duration, performer, and the like. Wireless output circuit 514A of media transmitter 502A wirelessly transmits the playlist (step 610). Media receivers 502B-N store the playlist in memories 510, and preferably display playlist on output devices 526.

The playlist can be modified at any time. For example, when a new wireless media player 502 joins wireless multimedia jukebox system 500, the media files available for sharing by new wireless media player 502 are preferably added to the playlist as described above. As another example, when a wireless media player 502 leaves wireless multimedia jukebox system 500, for example when a wireless connection with that wireless media player 502 is lost, the media files available for sharing by that wireless media player 502 are preferably removed from the playlist. As a further example, wireless media players can make previously unavailable files available, and can make previously available files unavailable, for sharing.

In addition, the order of play of media files in the playlist can be modified, for example according to a voting scheme where users can use wireless media players 502 to vote for media files. Control circuit 512A of media transmitter 502A then modifies the order of play according to the votes.

Control circuit 512A of wireless media player 502A selects the first media file in the playlist (step 612). If the selected media file is local (step 614), that is, stored on storage device 508A of media transmitter 502A, then wireless output circuit 514A of media transmitter 502A transmits the selected media file (step 616), for example according to the techniques described above. Control circuit 512A of wireless media player 502A then selects the next media file in the playlist (resuming at step 612).

However, when the selected media file is not local, that is, stored on one of media receivers 502B-N, for example on media receiver 502B, media transmitter 502A transfers control of wireless multimedia jukebox system 500 to that media receiver 502B (step 618). Wireless media player 502B thereby becomes the media transmitter, while wireless media player 502A becomes a media receiver. Wireless media player 502B also preferably becomes the master of ad-hoc network 506 at the same time, for example by receiving a token from wireless media player 502A. Wireless device 502B then assembles the playlist (resuming at step 608), with wireless media player 502B now acting as the media transmitter and wireless media player 502A now acting as a media receiver.

In some embodiments, optional DRM circuit 528 implements one or more DRM techniques as the portions of the media file are received. For example, DRM circuit 528 removes some of the portions of a received media file from memory 510 before other portions of the media file are received and stored in memory 510, thereby ensuring that memory 510 never contains the entire media file.

Figure 7A:
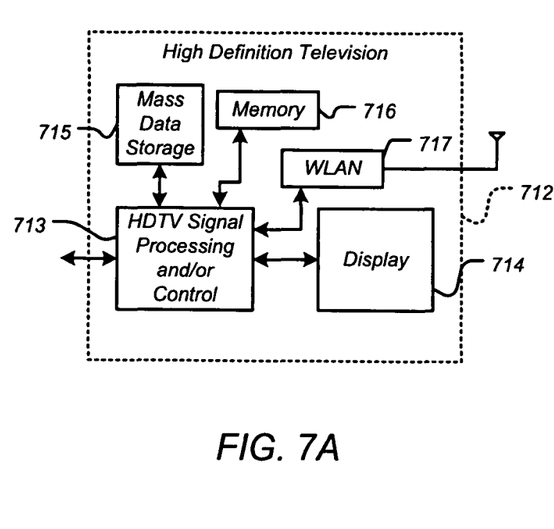
FIGS. 7A-7E show various exemplary implementations of the present invention.

FIGS. 7A-7E show various exemplary implementations of the present invention. Referring now to FIG. 7A, the present invention can be implemented in a high definition television (HDTV) 712. The present invention may implement either or both signal processing and/or control circuits, which are generally identified in FIG. 7A at 713, a WLAN interface and/or mass data storage of the HDTV 712. The HDTV 712 receives HDTV input signals in either a wired or wireless format and generates HDTV output signals for a display 714. In some implementations, signal processing circuit and/or control circuit 713 and/or other circuits (not shown) of the HDTV 712 may process data, perform coding and/or encryption, perform calculations, format data and/or perform any other type of HDTV processing that may be required.

The HDTV 712 may communicate with mass data storage 715 that stores data in a nonvolatile manner such as optical and/or magnetic storage devices. The HDD may be a mini HDD that includes one or more platters having a diameter that is smaller than approximately 1.8". The HDTV 712 may be connected to memory 716 such as RAM, ROM, low latency nonvolatile memory such as flash memory and/or other suitable electronic data storage. The HDTV 712 also may support connections with a WLAN via a WLAN network interface 717.

Figure 7B:
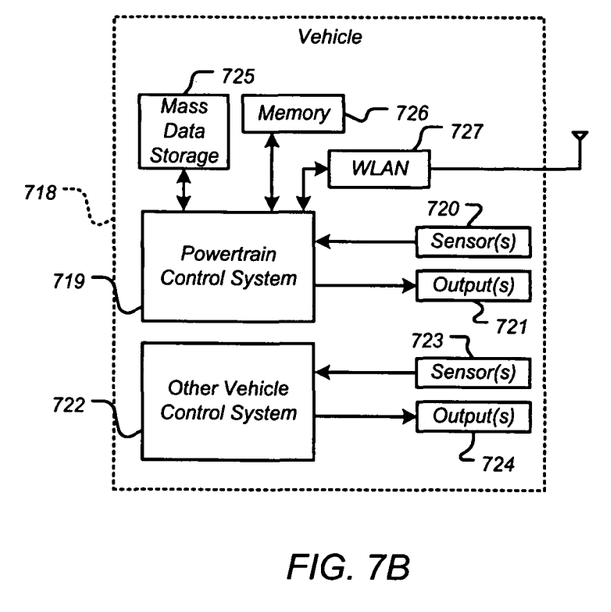

Referring now to FIG. 7B, the present invention implements a control system of a vehicle 718, a WLAN interface and/or mass data storage of the vehicle control system. In some implementations, the present invention implements a powertrain control system 719 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 722 of the vehicle 718. The control system 722 may likewise receive signals from input sensors 723 and/or output control signals to one or more output devices 724. In some implementations, the control system 722 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 719 may communicate with mass data storage 725 that stores data in a nonvolatile manner. The mass data storage 725 may include optical and/or magnetic storage devices for example hard disk drives HDD and/or DVDs. The HDD may be a mini HDD that includes one or more platters having a diameter that is smaller than approximately 1.8". The powertrain control system 719 may be connected to memory 726 such as RAM, ROM, low latency nonvolatile memory such as flash memory and/or other suitable electronic data storage. The powertrain control system 719 also may support connections with a WLAN via a WLAN network interface 727. The control system 722 may also include mass data storage, memory and/or a WLAN interface (all not shown).

Figure 7C:
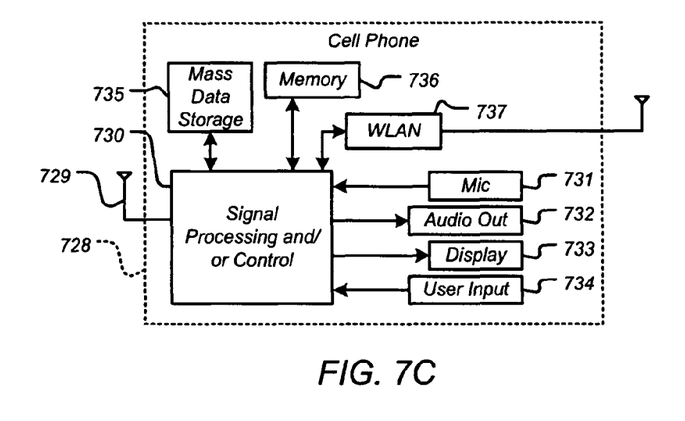

Referring now to FIG. 7C, the present invention can be implemented in a cellular phone 728 that may include a cellular antenna 729. The present invention may implement either or both signal processing and/or control circuits, which are generally identified in FIG. 7C at 730, a WLAN interface and/or mass data storage of the cellular phone 728. In some implementations, the cellular phone 728 includes a microphone 731, an audio output 732 such as a speaker and/or audio output jack, a display 733 and/or an input device 734 such as a keypad, pointing device, voice actuation and/or other input device. The signal processing and/or control circuits 730 and/or other circuits (not shown) in the cellular phone 728 may process data, perform coding and/or encryption, perform calculations, format data and/or perform other cellular phone functions.

The cellular phone 728 may communicate with mass data storage 735 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 728 may be connected to memory 736 such as RAM, ROM, low latency nonvolatile memory such as flash memory and/or other suitable electronic data storage. The cellular phone 728 also may support connections with a WLAN via a WLAN network interface 737.

Figure 7D:
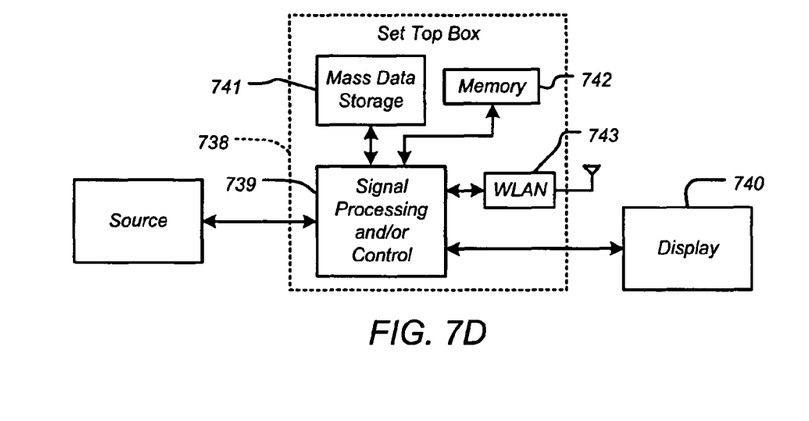

Referring now to FIG. 7D, the present invention can be implemented in a set top box 738. The present invention may implement either or both signal processing and/or control circuits, which are generally identified in FIG. 7D at 739, a WLAN interface and/or mass data storage of the set top box 738. The set top box 738 receives signals from a source such as a broadband source and outputs standard and/or high definition audio/video signals suitable for a display 740 such as a television and/or monitor and/or other video and/or audio output devices. The signal processing and/or control circuits 739 and/or other circuits (not shown) of the set top box 738 may process data, perform coding and/or encryption, perform calculations, format data and/or perform any other set top box function.

The set top box 738 may communicate with mass data storage 743 that stores data in a nonvolatile manner. The mass data storage 743 may include optical and/or magnetic storage devices for example hard disk drives HDD and/or DVDs. The HDD may be a mini HDD that includes one or more platters having a diameter that is smaller than approximately 1.8". The set top box 738 may be connected to memory 742 such as RAM, ROM, low latency nonvolatile memory such as flash memory and/or other suitable electronic data storage. The set top box 738 also may support connections with a WLAN via a WLAN network interface 743.

Figure 7E:
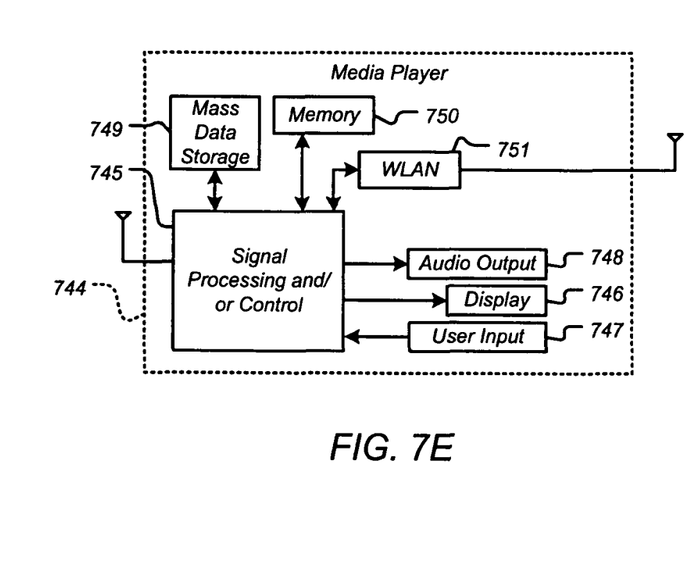

Referring now to FIG. 7E, the present invention can be implemented in a media player 744. The present invention may implement either or both signal processing and/or control circuits, which are generally identified in FIG. 7E at 745, a WLAN interface and/or mass data storage of the media player 744. In some implementations, the media player 744 includes a display 746 and/or a user input 747 such as a keypad, touchpad and the like. In some implementations, the media player 744 may employ a graphical user interface (GUI) that typically employs menus, drop down menus, icons and/or a point-and-click interface via the display 746 and/or user input 747. The media player 744 further includes an audio output 748 such as a speaker and/or audio output jack. The signal processing and/or control circuits 745 and/or other circuits (not shown) of the media player 744 may process data, perform coding and/or encryption, perform calculations, format data and/or perform any other media player function.

The media player 744 may communicate with mass data storage 749 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 744 may be connected to memory 750 such as RAM, ROM, low latency nonvolatile memory such as flash memory and/or other suitable electronic data storage. The media player 744 also may support connections with a WLAN via a WLAN network interface 751. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A system including a plurality of devices, wherein each of the plurality of devices is alternately selectable to be a media transmitter while remaining ones of the plurality of devices are to be selected as media receivers, the system comprising:

a first device to be selected as the media transmitter, wherein the media transmitter has control of transmitting media files in a playlist to the media receivers, the first device comprising a storage device configured to store a first media file of first data, a memory configured to store the playlist, the playlist comprising a first pointer indicating that the first media file is stored on the first device, and at least one second pointer indicating that at least one second media file of second data is stored on one of the remaining ones of the plurality of devices, and an output circuit configured to i) transmit the playlist, ii) transmit the first media file to the remaining ones of the plurality of devices, and iii) in response to the first device determining that the second media file is stored on the one of the remaining ones of the plurality of devices, transfer the control of transmitting the media files in the playlist such that the one of the remaining ones of the plurality of devices is selected as the media transmitter;

a second device corresponding to the one of the remaining ones of the plurality of devices, the second device configured to i) receive the playlist, ii) receive the first media file from the first device when the second device is selected as a media receiver, and iii) in response to the output circuit transferring the control of transmitting the media files in the playlist, transmit the second media file to the first device and the remaining ones of the plurality of devices; and an authentication circuit configured to authenticate each of the remaining ones of devices before transmitting the first media file, wherein the authentication circuit is configured to limit a number of the remaining ones of the plurality of devices according to a throughput of a network connecting the first device and the remaining ones of the plurality of devices.

2. The system of claim 1, further comprising:
an input circuit configured to receive a third pointer to a third media file of third data stored on one of the second devices; and
a control circuit configured to add the third pointer to the playlist.

3. The system of claim 1, further comprising:
a control circuit configured to control the playlist;
wherein, when a connection to the second device is lost, the control circuit is configured to remove, from the playlist, the second pointer.

4. The system of claim 1, further comprising:
an input circuit configured to receive a plurality of votes from the remaining ones of the plurality of devices; and
a control circuit configured to modify an order of play of the pointers in the playlist according to the votes.

5. The system of claim 1:
wherein the first device is configured to act as a master of an ad-hoc network comprising the first device and the remaining ones of the plurality of devices.

6. The system of claim 5:
wherein, to transfer the control of transmitting the media files in the playlist, the output circuit is configured to transmit a token to the second device; and
wherein the second device becomes the master of the ad-hoc network in response to the token.

7. A media player comprising the system of claim 1.

8. The media player of claim 7, wherein the media player is compliant with at least one standard selected from the group consisting of IEEE standards 802.11, 802.11a, 802.11b, 802.11g, 802.11n, 802.16, and 802.20.

9. A method of operating a system including a plurality of devices, wherein each of the plurality of devices is alternately selectable as a media transmitter while remaining ones of the plurality of devices are selected as media receivers the method comprising:
selecting a first device selected as the media transmitter, wherein the media transmitter has control of transmitting media files in a playlist to the media receivers;
storing a first media file of data on the first device;
storing the playlist on the first device, the playlist comprising
a first pointer indicating that the first media file is stored on the first device and
at least one second pointer indicating that at least one second media file of second data is stored on one of the remaining ones of the plurality of devices;
transmitting the playlist the first media file from the first device to the remaining ones of the plurality of devices;
in response to the first device determining that the second media file is stored on the one of the remaining ones of the plurality of devices, transferring the control of transmitting the media files in the playlist such that the one of the remaining ones of the plurality of devices is selected as the media transmitter;
using a second device corresponding to the one of the remaining ones of the plurality of devices,
receiving the playlist and the first media file from the first device when the second device is selected as a media receiver,
in response to the transferring the control of transmitting the media files in the playlist, transmitting the second media file to the first device and the remaining ones of the plurality of devices;
authenticating each of the remaining ones of the plurality of devices before transmitting the first media file; and
limiting the number of the remaining ones of the plurality of devices according to a throughput of a network connecting the first device and the remaining ones of the plurality of devices.

10. The method of claim 9, further comprising:
receiving a third pointer to a third media file of third data stored on the one of the remaining ones of the plurality of devices; and
adding the third pointer to the playlist.

11. The method of claim 9, further comprising:
removing, from the playlist, the at least one second pointer when a connection to the second device is lost.

12. The method of claim 9, further comprising:
receiving a plurality of votes from the remaining ones of the plurality of devices; and
modifying an order of play of the pointers in the playlist according to the votes.

13. The method of claim 9, further comprising:
the first device acting as a master of an ad-hoc network comprising the first device and the remaining ones of the devices.

14. The method of claim 13, further comprising:
transmitting a token from the first device to the second device to transfer the control of transmitting the media files in the playlist when the one of the second media files of the second data is to be played;
wherein the second device becomes the master of the ad-hoc network in response to the token.

15. The method of claim 9, wherein the first device is compliant with at least one standard selected from the group consisting of IEEE standards 802.11, 802.11a, 802.11b, 802.11g, 802.11n, 802.16, and 802.20.

* * * * *